United States Patent
Yau et al.

(10) Patent No.: US 10,432,583 B1
(45) Date of Patent: Oct. 1, 2019

(54) ROUTING AGENT PLATFORM WITH A 3-TIER ARCHITECTURE FOR DIAMETER COMMUNICATION PROTOCOL IN IP NETWORKS

(71) Applicant: Syniverse Technologies, LLC, Tampa, FL (US)

(72) Inventors: Edward Yau, Tseung Kwan O (HK); Paul Sun, Kowloon (HK); Jerry Handra, Singapore (SG); Kin Cheung, Tuen Mun (HK); Jacky Luk, Kowloon (HK); Kenneth Mak, North Point (HK)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/353,581

(22) Filed: Mar. 14, 2019

Related U.S. Application Data

(60) Provisional application No. 62/642,906, filed on Mar. 14, 2018.

(51) Int. Cl.
*H04L 29/12* (2006.01)
*H04L 12/741* (2013.01)

(52) U.S. Cl.
CPC .......... *H04L 61/2539* (2013.01); *H04L 45/74* (2013.01); *H04L 61/2507* (2013.01); *H04L 61/2567* (2013.01)

(58) Field of Classification Search
CPC . H04L 45/00; H04L 49/25; H04L 2012/6443; H04L 5/00; H04W 40/00
USPC ........................................................ 709/238
See application file for complete search history.

(56) References Cited

U.S. PATENT DOCUMENTS

| | | | | |
|---|---|---|---|---|
| 8,478,828 | B2* | 7/2013 | Craig | H04L 63/0892 709/206 |
| 8,578,050 | B2* | 11/2013 | Craig | H04L 63/20 370/401 |
| 8,750,126 | B2* | 6/2014 | McCann | H04L 43/00 370/236 |
| 8,958,306 | B2* | 2/2015 | McCann | H04L 63/0263 370/241 |
| 10,200,852 | B1* | 2/2019 | Datar | H04W 8/06 |
| 10,277,576 | B1* | 4/2019 | Yau | H04L 63/08 |
| 2012/0063414 | A1* | 3/2012 | Ramachandran | H04W 36/0022 370/331 |
| 2014/0258369 | A1* | 9/2014 | Liu | H04L 67/1002 709/203 |

(Continued)

*Primary Examiner* — Mahran Y Abu Roumi
(74) *Attorney, Agent, or Firm* — Andriy Lytvyn; Smith & Hopen, P.A.

(57) ABSTRACT

This invention is a system and method for a high-performance Diameter Routing Agent (DRA) platform with a three-tier architecture. The DRA platform consists of a Diameter Connection Router (DCR), a Diameter Load Balancer (DLB), and multiple DRA Instances. DCR is a front-end to all external Peers and distributes Diameter connections to a DLB. DLB is a Diameter transaction load balancer and distributes individual Diameter transaction to a DRA. DRA is a Diameter Routing Agent to implement business logic to determine routing of an incoming request to a destination peer as well as message mediation. A public Internet Protocol (IP) address of the DCR is exposed to the external peers as a single point of contact between the peers and the computer network, wherein an internal topology of the computer network remains hidden from the peers.

15 Claims, 14 Drawing Sheets

(56) References Cited

U.S. PATENT DOCUMENTS

| | | | |
|---|---|---|---|
| 2014/0282903 A1* | 9/2014 | Singh | H04L 63/08 |
| | | | 726/4 |
| 2016/0050179 A1* | 2/2016 | Wang | H04L 61/2589 |
| | | | 726/12 |
| 2016/0057607 A1* | 2/2016 | Dubesset | H04W 8/12 |
| | | | 455/433 |
| 2016/0212052 A1* | 7/2016 | Zaidi | H04L 47/193 |
| 2016/0373304 A1* | 12/2016 | Sharma | H04W 24/08 |
| 2017/0034048 A1* | 2/2017 | Karandikar | H04L 45/60 |
| 2018/0198764 A1* | 7/2018 | Kumar | H04L 63/0428 |

* cited by examiner

ROUTING AGENT PLATFORM WITH A 3-TIER ARCHITECTURE FOR DIAMETER COMMUNICATION PROTOCOL IN IP NETWORKS

BACKGROUND OF THE INVENTION

1. Field of the Invention

This invention relates generally to the field of telecommunications networks, specifically to the Diameter Protocol in Internet Protocol (IP) network.

More specifically, it relates to methods and systems of building a high-performance Diameter Routing Agent (DRA) Platform with a 3-tier architecture.

2. Brief Description of the Related Art

Diameter protocol in IP network is defined by the following standards: IETF RFC 3588 and RFC 6733. Diameter is a communication protocol widely used in telecommunications for authentication, authorization and accounting. It is adopted by 3rd Generation Partnership Project (3GPP) as the communication standard for many interfaces for mobile networks, including S6a/S6d, S9, Sh, Cx, Dx, Gx, Gy/Ro, and others.

Diameter may run over Transmission Control Protocol (TCP) or Stream Control Transmission Protocol (SCTP) transport protocols, which in turn run over IP networks.

Diameter is a client-server protocol. Diameter requests are sent from a client to a server, and answers are sent from a server to a client.

RFC3588/6733 defines Diameter Agents as Relay Agents, Proxy Agents, Redirect Agents and Translation Agents. They are also commonly known as Diameter Routing Agents (DRA).

A DRA may perform message mediation on both request and answer messages, such as adding, modifying, or deleting an Attribute-Value-Pair (AVP).

A Diameter request and answer message pair is collectively referred to as a Diameter transaction.

A typical flow of a Diameter transaction that traverses a DRA: 1) receives a request; 2) performs message mediation, if necessary; 3) makes routing decision; 4) performs message mediation, if necessary; 5) sends request to the destination; 6) receives an answer; 7) performs message mediation, if necessary; 8) routes the answer to the Peer from which the request was received.

In a typical large-scale deployment of DRA, there may be hundreds, or thousands of Diameter Peers connecting to the DRA, any one of the Peers may send requests to any other Peer. In other words, any Peer must be able to send messages to any other Peer connected to the DRA. In a typical large-scale deployment of DRA, a Peer may send hundreds or thousands of transactions-per-second (TPS). The aggregated traffic capacity from all Peers may well exceed what can be handled by a single instance of DRA application or server.

A typical TCP/SCTP load balancer does not work in Diameter protocol applications because in the Diameter protocol, two Peers must first establish a session through Capability-Exchange-Request (CER) and Capabilities-Exchange-Answer (CEA) procedure. A TCP/SCTP load balancer that simply routes Diameter requests to a DRA does not ensure the CER/CEA procedure was successfully completed between an external Peer and every DRA. Moreover, a load balancer may not be able to handle the required capacity. Having multiple load balancers is not a viable solution because the DRA must expose a single IP to all external Peers so that the internal topology is hidden from external entities.

SUMMARY OF THE INVENTION

In an embodiment, the invention pertains to a high-performance DRA with a 3-tier architecture to handle traffic capacity in a large-scale deployment. The 3-tier architecture involves 1) a Diameter Connection Router (DCR), 2) multiple Diameter Load Balancer (DLB), and 3) multiple DRA instances.

DCR is a front-end module that interfaces with all external Peers. In other words, all external Peers send messages to the public IP address of the DCR. On the other hand, all outgoing message from the DRA platform to external Peer use the source IP address of DCR.

Upon a new connection request from external Peers, DCR selects a DLB and routes the connection to the DLB. In other words, the DCR acts as a load balancer and distributes incoming connections to DLB.

For every Diameter connection with external Peer, DLB establishes a corresponding connection with each DRA. In other words, Diameter connections for DLB < > external-Peer and DLB < > DRA is one-to-many.

DRA is the entity that makes routing decision for Diameter requests.

The complete flow of a Diameter transaction is as follows: 1) request: Diameter-client→DCR→DLB→DRA→DLB→DCR→Diameter-server, 2) answer: Diameter-server→DCR→DLB→DRA→DLB→DCR→Diameter-client.

In a typical installation, each DRA may handle thousands of TPS, whereas each DLB may handle tens of thousands of TPS, and each DCR may handle hundreds of thousands of TPS of Diameter transactions.

In an embodiment, the invention pertains to a method and system for routing messages using Diameter Protocol. In this embodiment, the DCR is a frontend module interfacing with a plurality of peers external to the computer network. The public IP address of the DCR is exposed to the external peers as a single point of contact to the computer network, therefore, hiding an internal topology of the computer network from the peers.

Multiple DLBs are in communication with the DCR, and each DLB is connected to each of the plurality of the DRAs. This one-to-many connection enables a message from an external peer to reach any DRA.

When a first external peer sends a message to the public IP of the DCR, the DCR selects one of the DLBs and routs the message to that DLB. All subsequent messages from the first peer bypass the DCR and are routed from the first peer to the selected DLB. The DLB then routes the message to one of the DRAs. The DRA identifies a second DLB that has a routing path to the destination external peer and routes the message to the second DLB. The second DLB routes the message to the DCR, which then routes the message to the destination peer.

In an embodiment, the DCR performs destination-Network Address Translation (NAT) to translate a destination IP address of the message from the public IP address of the DCR to an IP address of the DLB. In another aspect of the invention, prior to routing the message to the second peer, the DCR performs source-NAT to translate a source IP address of the message from the IP address of the second DLB to the public IP address of the DCR.

In an embodiment, the DLB performs a Stream Control Transmission Protocol (SCTP)-layer NAT to translate the IPv4Address parameter of the message from an IP address of the second DLB to the public IP address of the DCR.

In an embodiment, the DLB is configured to monitor the availability of each of the plurality of DRAs and remove an unavailable DRA from the pool of DRAs available for traffic distribution.

The DRA determines a routing path for routing the message to the second peer. The DRA may perform message mediation using a rule-engine. The rule-engine may involve an attribute selected from Diameter headers, Attribute-Value-Pair (AVP) of the message, and/or an identity of the source peer.

In an embodiment, the DCR implements initial packet handling of the message using 'Netfilter' in LINUX operating system and implements Network Address Translation using 'iptable' in LINUX operating system.

In an embodiment, one of the DLBs detects that all connections between the first DLB and the plurality of the DRAs are broken, the DLB terminates the connection with the source peer. If the DCR receives a request to teardown a connection with a peer, the DCR issues a command to delete a rule requiring that all subsequent messages from that peer bypass the DCR and are routed to the first DLB.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
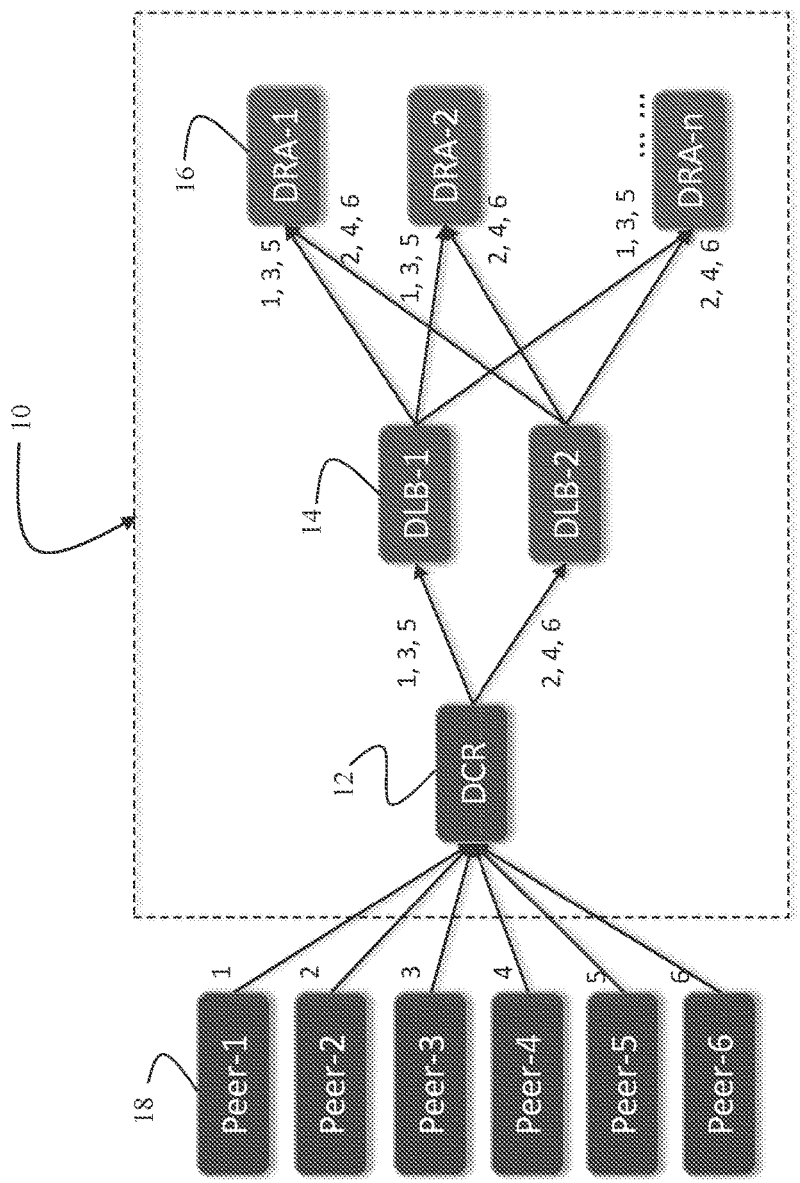
FIG. 1 is a block diagram schematically depicting the logical architecture of an embodiment of the present invention.

In the embodiment depicted in FIG. 1, the invention is a specialized networking and application system that handles routing of Diameter messages between Diameter clients and Peers (generally referred to as 'Peers').

The present invention is a high-performance Diameter Routing Agent (DRA) Platform 10 that consists of Diameter Connection Router (DCR) 12, Diameter Load Balancer (DLB) 14, and Diameter Routing Agent (DRA) 16.

In the embodiment depicted in FIG. 1, when the DRA Platform 10 acts as server, DCR 12 distributes an incoming Diameter connection from a Peer 18 to one of DLBs 14. When a first connection, via DCR 12, is established between remote Peer 18 and DLB 14, DLB 14 establishes a corresponding connection to each DRA 16.

In the embodiment depicted in FIG. 1, when DRA Platform 10 acts as client, each DRA 16 establishes a connection with DLB 14. DLB 14 then establishes a corresponding connection to remote Peer 18, via the DCR 12.

Figure 2:
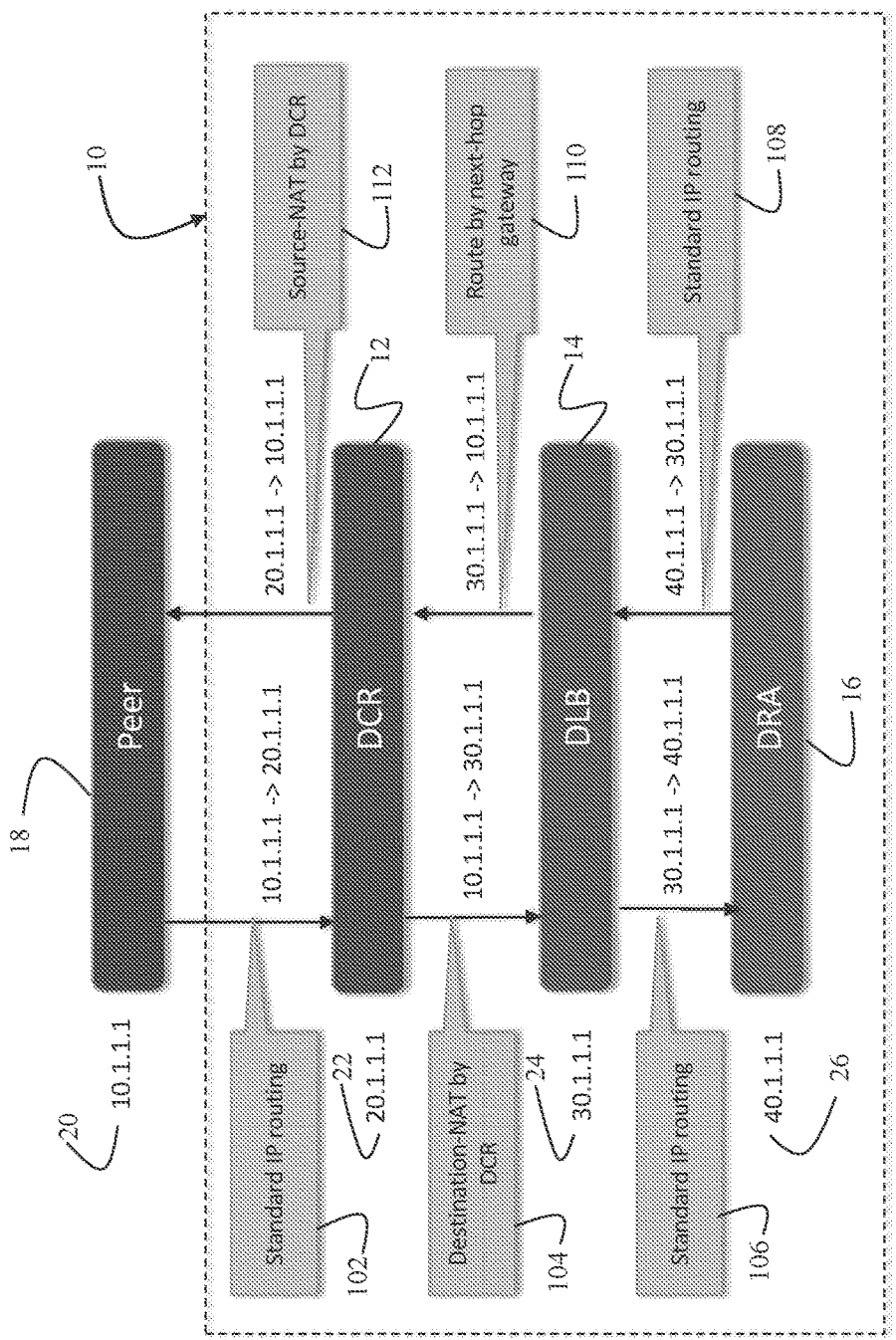
FIG. 2 is a block diagram schematically depicting the IP layer routing and Network Address Translation (NAT) operations of the present invention.

FIG. 2 depicts the IP-layer Network Address Translation (NAT) performed by DCR 12 to route messages between external and internal networks. Peer 18 has IP address 20, DCR 12 has an IP address 22, DLB 14 has an IP address 24, and DRA 16 has an IP address 26.

IP address 22 of DCR 12 is public and advertised to external Peer 18 as the single point of contact to DRA Platform 10. Referring to FIG. 2, in step 102, upon receiving a new SCTP/TCP connection request packet from external Peer 18, DCR 12 selects one of DLBs 14 to handle this connection. In step 104, DCR 12 performs a destination-NAT to translate the destination IP from DCR 12 IP address 22 to DLB 14 IP address 24. In step 106, standard IP routing is used for routing the packet from DLB 14 to DRA 12. Subsequent incoming IP packets of the same flow from Peer 18 to DRA 16 will follow the same path and logic.

In step 108, standard IP routing is used to route an outgoing IP packet from DRA 16 to DLB 14. In step 110, DLB 14 routes the outgoing IP packet to DCR 12 by next-hop gateway. Upon receiving the outgoing IP packet from DLB 14, DCR 12 performs a source-NAT, in step 112, to translate the source IP from DLB IP address 24 to DCR IP address 22. The outgoing packet is then routed to Peer 18.

Figure 3:
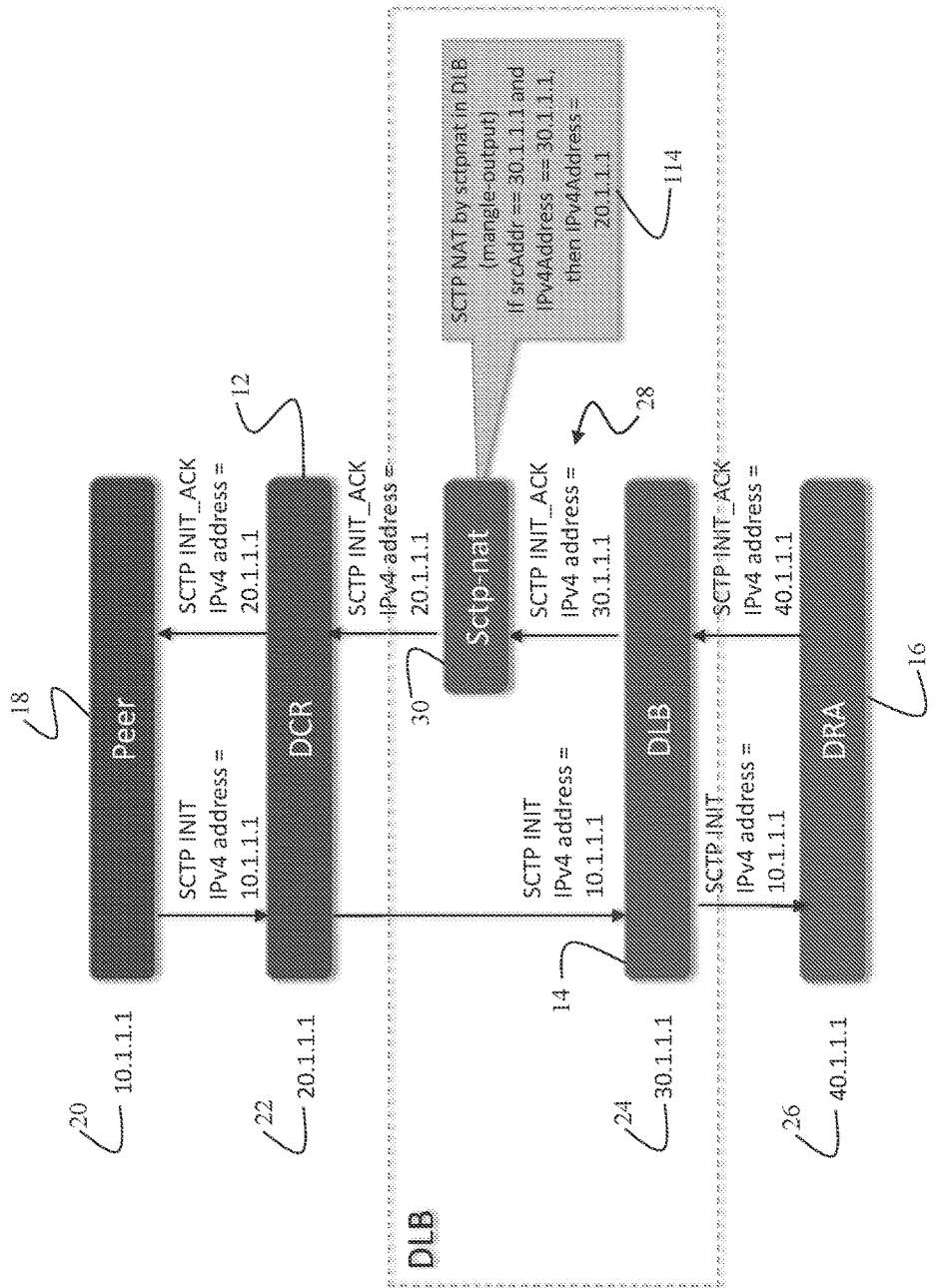
FIG. 3 is a block diagram schematically depicting the SCTP-layer routing and Network Address Translation (NAT) operations of the present invention.

FIG. 3 depicts an embodiment, in which the SCTP-layer NAT performed by DLB 14 in routing messages between external and internal networks. An outgoing SCTP INIT or INIT_ACK chunk 28 from DLB 12 main application contains its own IP address in IPv4Address parameter. In step 114, a 'sctpnat' module 30 in DLB node performs NAT to translate the IPv4Address parameter from DLB IP address 24 to DCR IP address 22. As a result, the outgoing INIT or INIT_ACK chunk from DCR 12 to external Peer 18 will contain DCR IP address 22 in the IPv4Address parameter.

In other embodiments, SCTP INIT or INIT_ACK NAT may be performed in DLB 12 main application.

Figure 4:
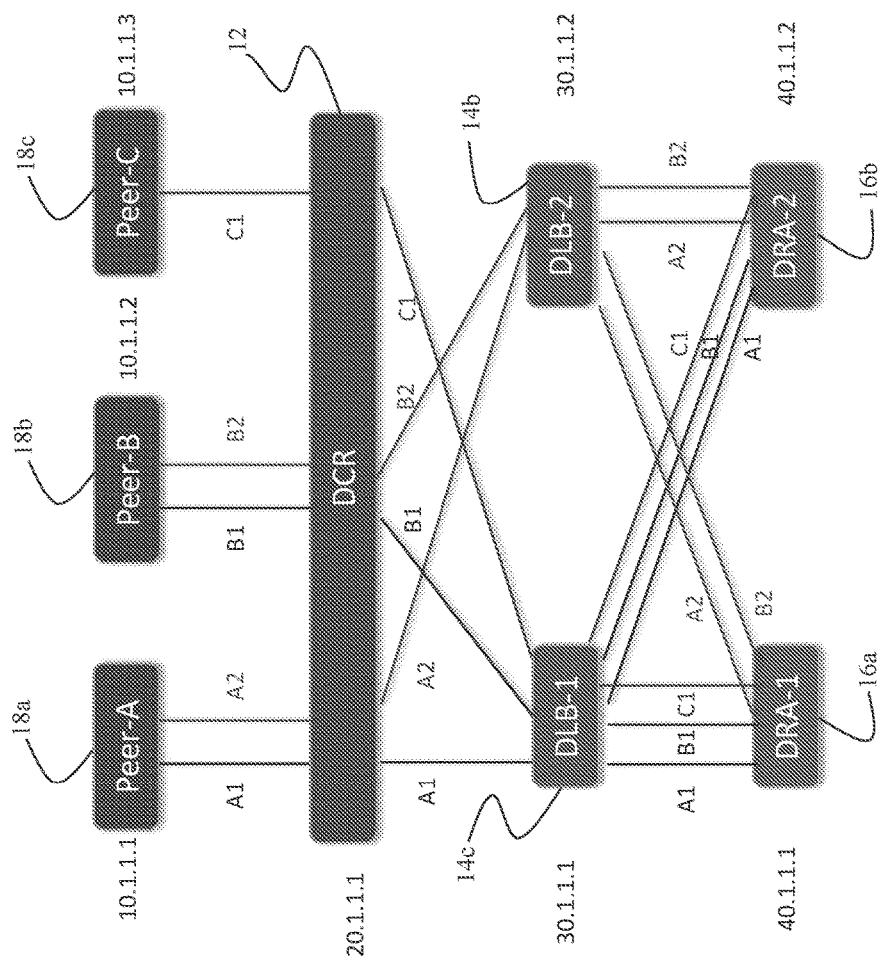
FIG. 4 is a block diagram schematically depicting the network connections between DCR, DLB and DRA.

FIG. 4 depicts an exemplary network connections mapping between DCR 12, DLB-1 14a, DLB-2 14b, DRA-1 16a, and DRA-2 16b. Each connection between DCR 12 and one of external Peers 18 (in this example, 18a, 18b, or 18c) will have a single corresponding connection to one of available DLBs 16 (in this example, either DLB-1 14a or DLB-2 14b). Each connection between DCR 12 and one of DLBs 14 will have a corresponding connection to every DRA 16 (in this example, DRA-1 16*a* and DRA-2 16*b*). This scheme enables each DRA 16 to reach any external Peer 18 (18*a*, 18*b*, or 18*c*) through one of the DLBs 14 and then DCR 12. In other words, each external Peer 18 has an indirect connection to every DRA 16 regardless of which DLB 14 used.

Figure 5:
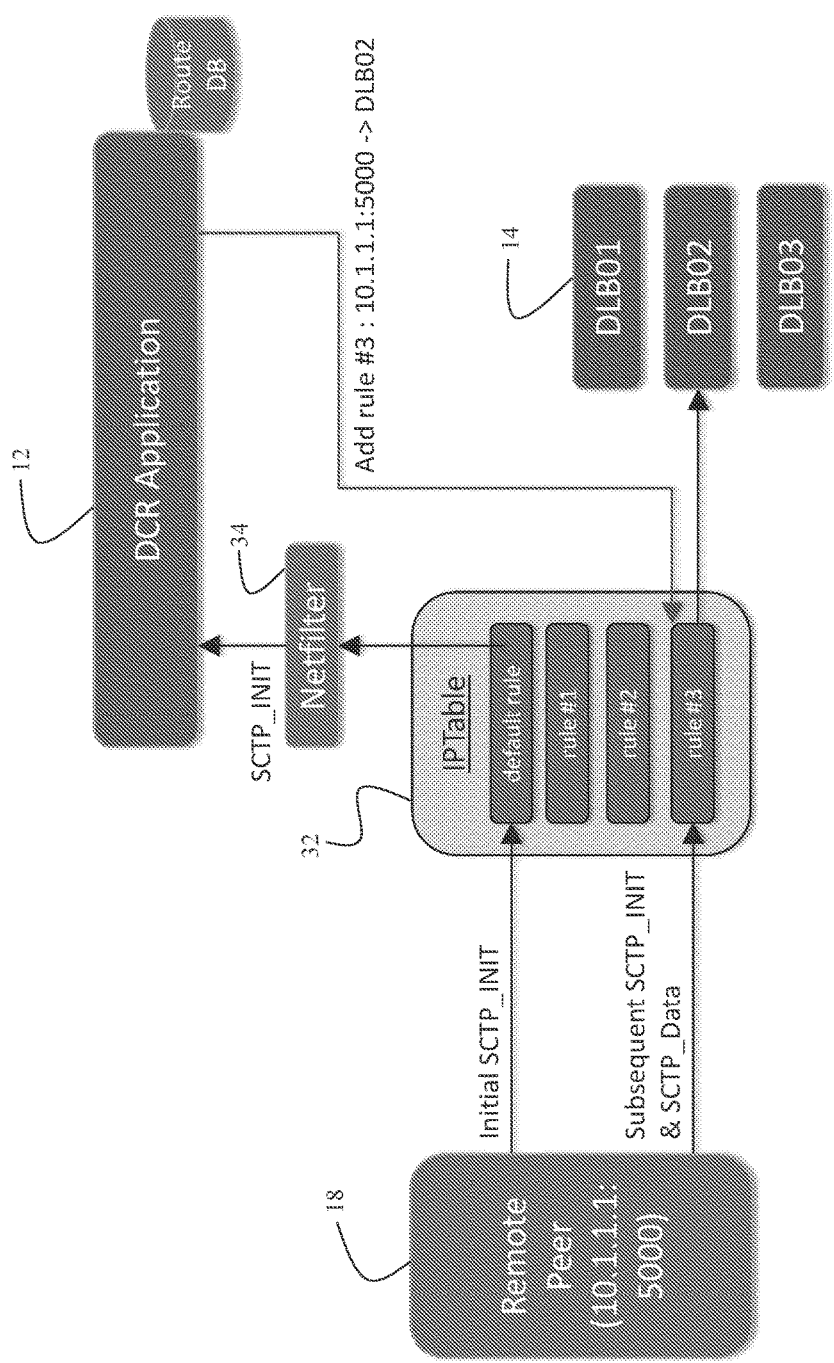
FIG. 5 is a block diagram schematically depicting the connection establishment flow at DCR.

FIG. 5 depicts an exemplary DCR 12 connection establishment flow for DRA Platform 10 acting as server with a Linux implementation. Upon receiving an incoming SCTP_INIT packet from an external Peer 18, DCR node has an iptable configuration 32 that routes the packet to DCR application 12 via Netfilter library 34. DCR application 12 then executes an internal logic (such as round-robin) to determine which DLB 14 shall handle this connection. Having selected a DLB 14, DCR 12 application will then insert a rule to iptable 32 to route subsequent packets of the same flow to DLB 14. Subsequent packets will then be directly exchanged between external Peer 18 and DLB 14, bypassing DCR application 12.

In other embodiments, SCTP packet handling may be performed natively in DCR 12 machine OS kernel or as an application running in user space.

Figure 6:
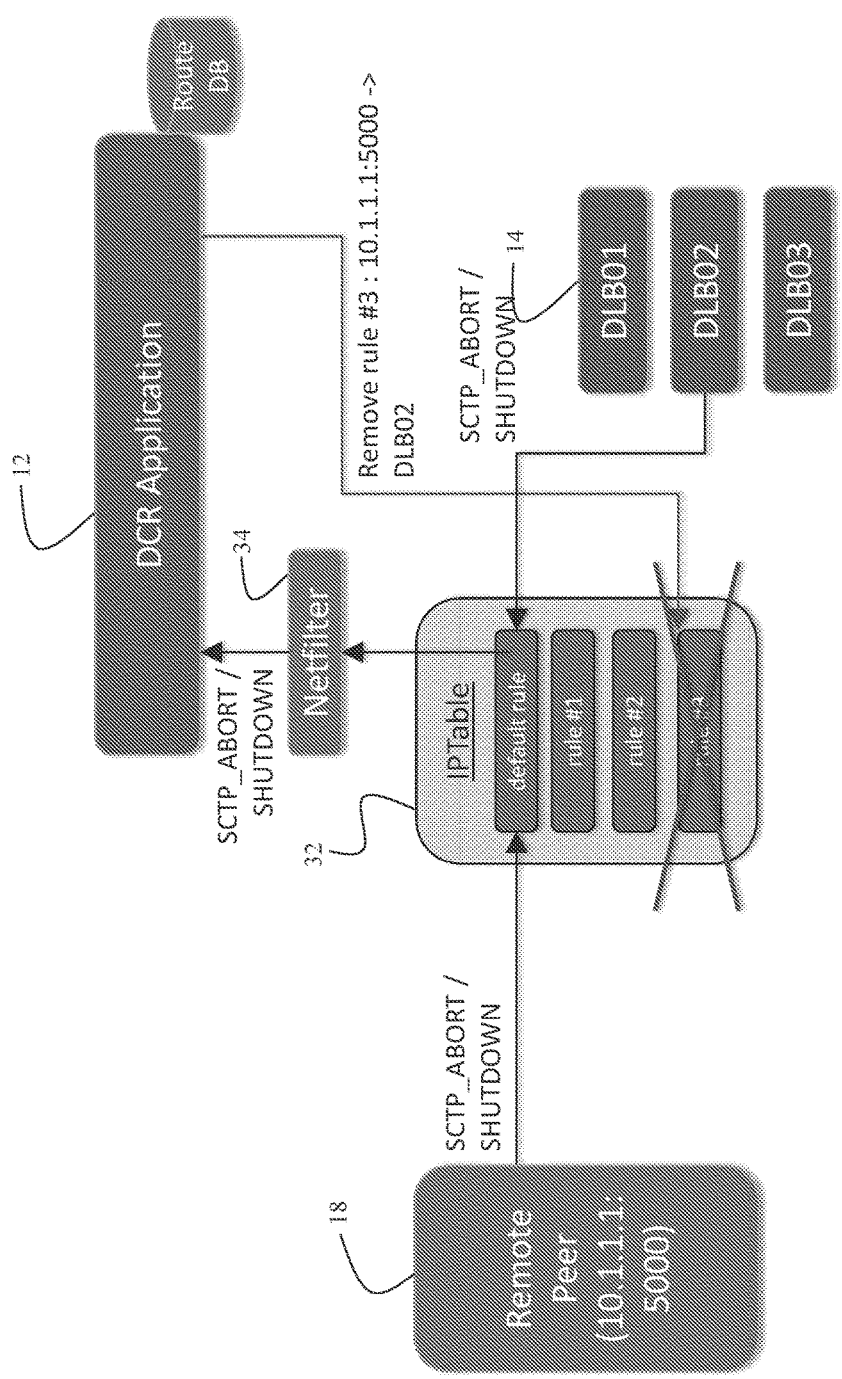
FIG. 6 is a block diagram schematically depicting the connection teardown flow at DCR.

FIG. 6 depicts an exemplary connection teardown flow for DRA Platform 10. When an external Peer 18 or DLB 14 decides to teardown a connection, Peer 18 sends a SCTP ABORT or SHUTDOWN packet to DCR 12. Upon receiving this packet, DCR 12 has an iptable 32 configuration that routes the packet to DCR application 12 via Netfilter library 34. DCR application 12 then issues a command to delete the rule in iptable 32 for routing traffic (between external Peer 18 and DLB 14) of this connection.

Figure 7:
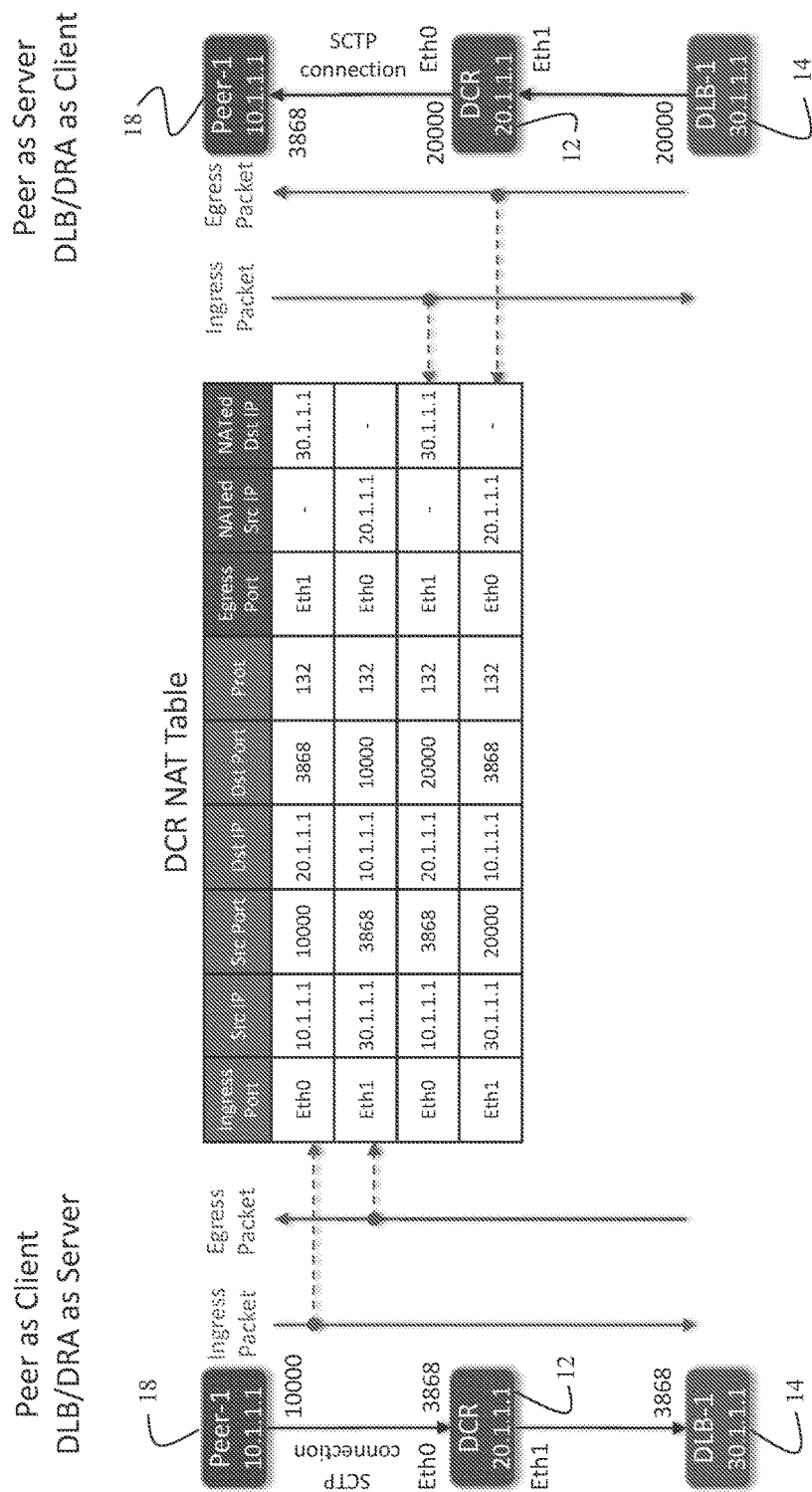
FIG. 7 is a diagram schematically depicting the DCR IP-layer NAT table.

FIG. 7 depicts the detailed IP-layer NAT operations performed in DCR 12. There are four scenarios, which are as follows:
1) DRA Platform 10 acting as server and routing an ingress packet. When an ingress packet is received from external Peer 18, DCR 12 will perform a destination NAT to translate the destination IP from DCR IP address 22 to DLB IP address 24.
2) DRA Platform 10 acting as server and routing an egress packet. When an egress packet is received from DLB 14, DCR 12 will perform a source NAT to translate the source IP from DLB IP address 24 to DCR IP address 22.
3) DRA Platform 10 acting as client and routing an ingress packet. When an ingress packet is received from external Peer, DCR will perform a destination NAT to translate the destination IP from DCR IP address 22 to DLB IP address 24.
4) DRA Platform 10 acting as client and routing an egress packet. When an egress packet is received from DLB, DCR will perform a source NAT to translate the source IP from DLB IP address 24 to DCR IP address 22.

Figure 8:
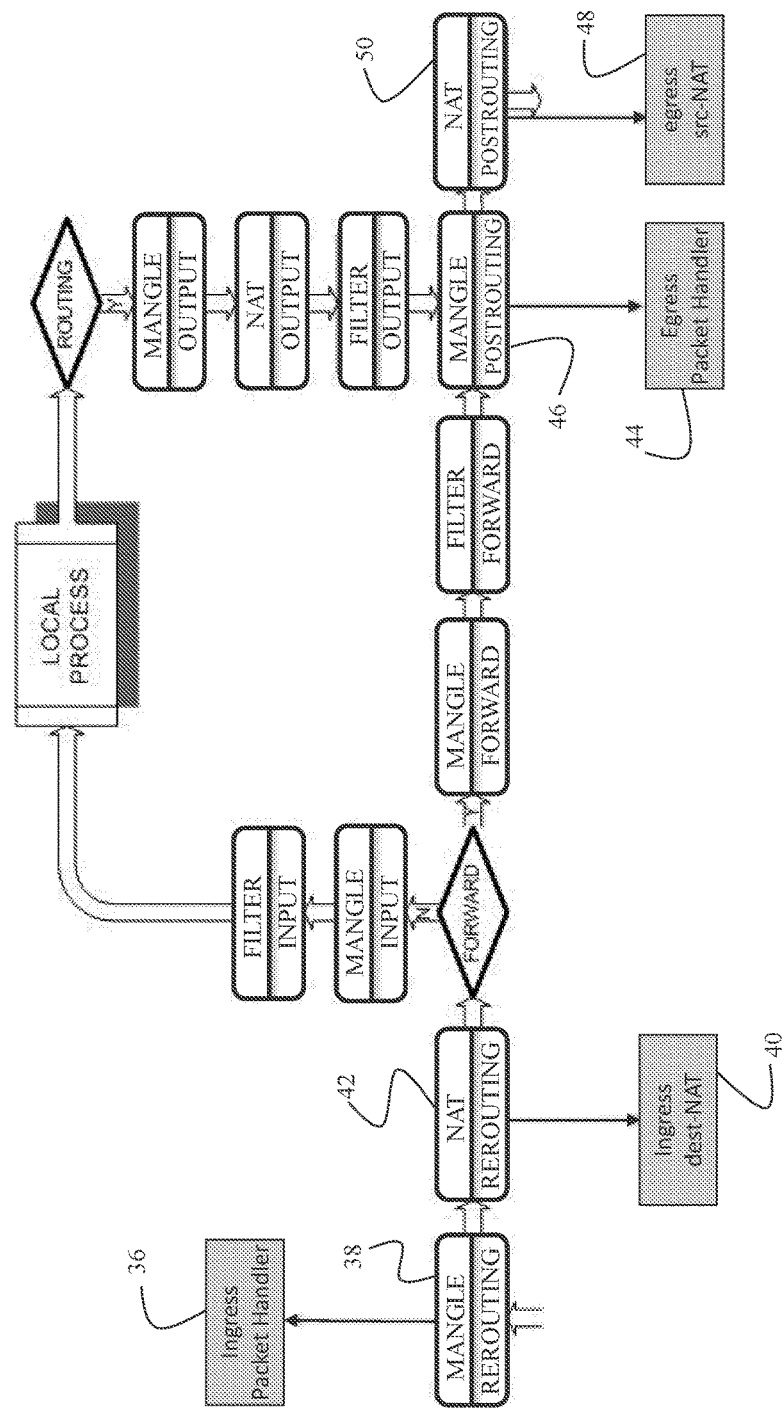
FIG. 8 is a block diagram schematically depicting the DCR IP-Table processing in a Linux operating system.

FIG. 8 depicts an embodiment, in which NAT is implemented using iptable 32 in a Linux environment. Ingress packet handler 36 is performed with a 'Pre-routing' rule in 'Mangle' table. Ingress destination-NAT 40 is performed with a 'Pre-routing' rule in 'NAT' table 42. Egress packet handler 40 is performed with a 'Post-routing' rule in 'Mangle' table 46. Egress source-NAT 48 is performed with a 'Post-routing' rule in 'NAT' table 50.

In other embodiments, source or destination NAT may be performed natively in the DCR machine OS kernel or as an application running in user space.

Figure 9:
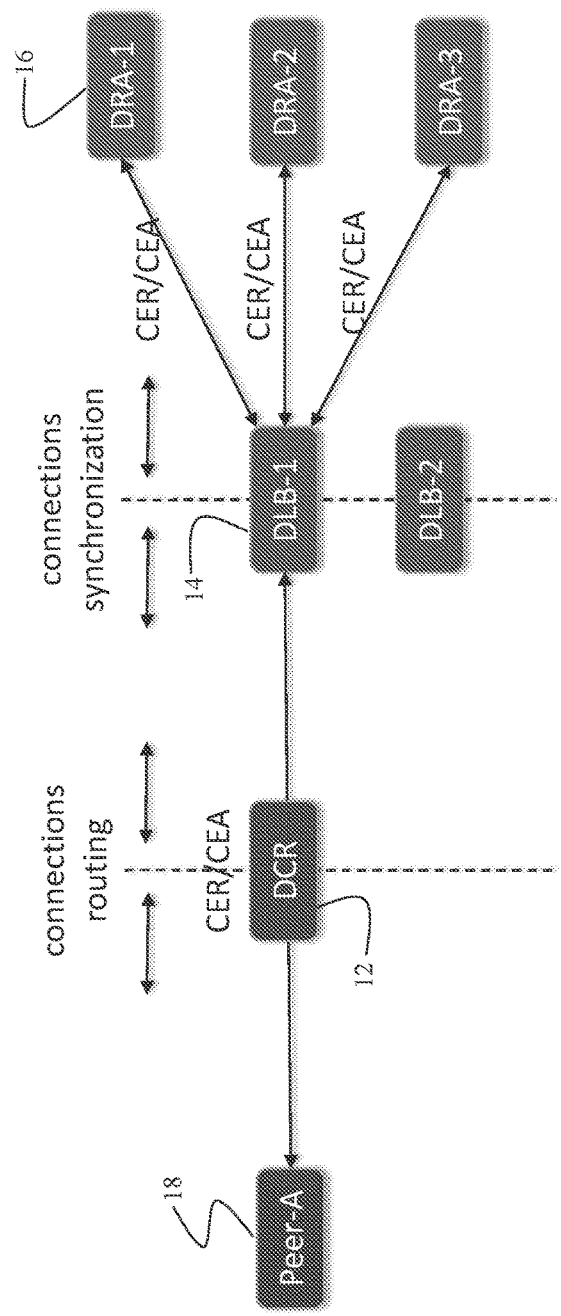
FIG. 9 is a block diagram schematically depicting the Diameter connections establishments mapping of the present invention.

FIG. 9 depicts an exemplary Diameter connections synchronization among the nodes of DRA Platform 10. For every Diameter connection established between an external Peer 18 and DLB 14, there is a corresponding Diameter connection between that DLB 14 and every DRA 16. Diameter Capabilities-Exchange-Request/Capabilities-Exchange-Answer (CER/CEA) happens between external Peer 18 and DLB 14, and between DLB 14 and DRA 16. When a Diameter connection is broken between DLB 14 and one DRA 16, DLB 14 and that DRA 16 will attempt to re-establish the connection (as long as at least one other DRA 16 remains connected to DLB 14). When all Diameter connections between DLB 14 and every DRA 16 are broken, the corresponding connection between external Peer 18 and DLB 14 will be disconnected by DLB 14. When Diameter connection between external Peer 18 and DLB 14 is broken, the corresponding connections between DLB 14 and every DRA 16 will be disconnected by DLB 14.

Figure 10:
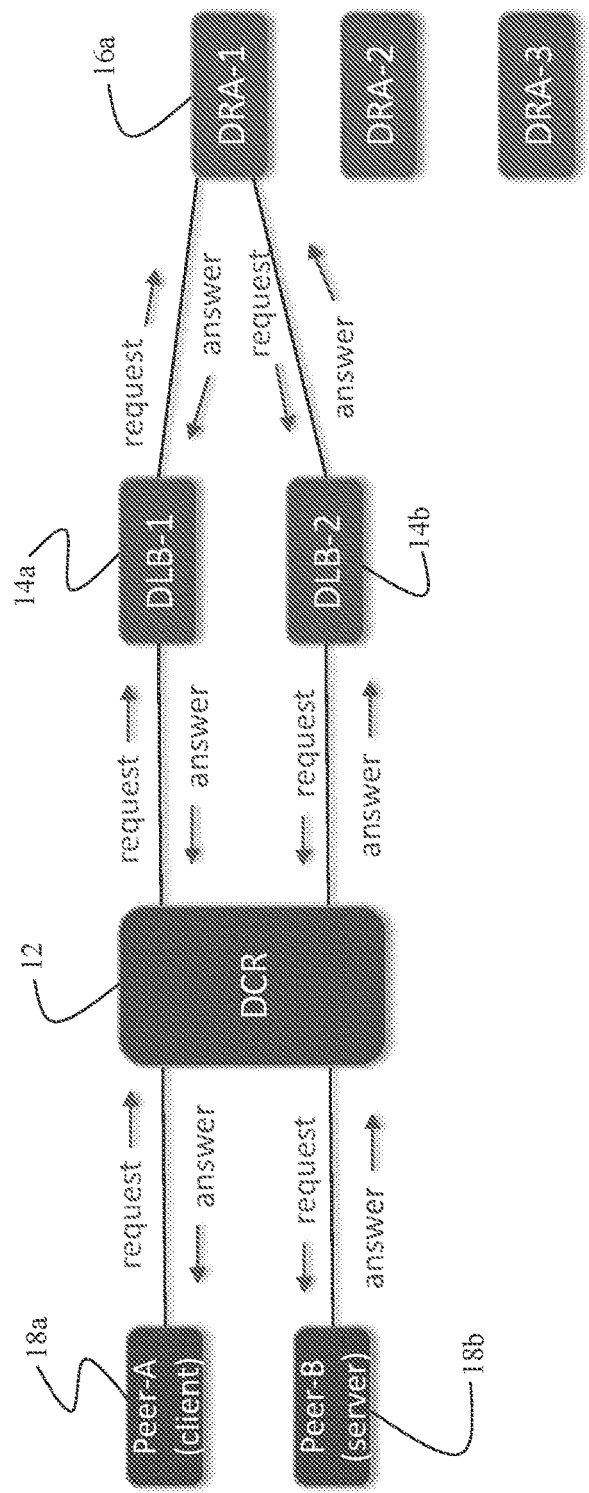
FIG. 10 is a block diagram schematically depicting the Diameter transaction flow of the present invention.

FIG. 10 depicts an exemplary Diameter Transaction Flow. An incoming Diameter request from source Peer-A 18*a* arrives at DCR 12. DCR 12 routes the request to DLB-1 14*a*, which in turn routes the request to DRA-1 16*a*. DRA-1 16*a* determines destination Peer-B 18*b* for this request and routes the request to Peer-B 18*b*. Peer-B 18*b* is connected to DRA-1 16*a* via DLB-2 14*b*. DLB-2 14*b* routes the request to destination Peer-B 18*b* via DCR 12. The Diameter answer follows the reverse path as in standard Diameter routing.

Figure 11:
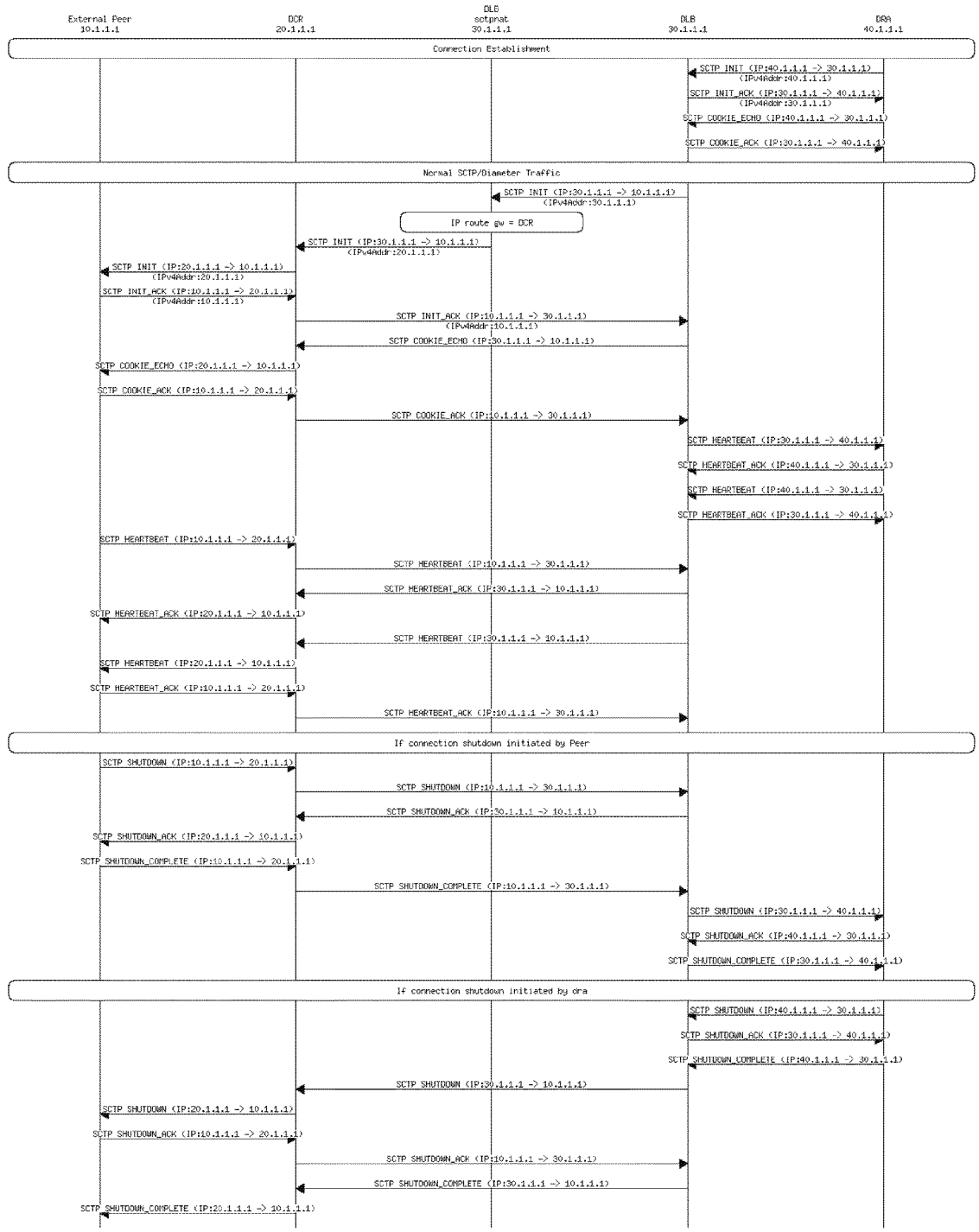
FIG. 11 is a sequential diagram schematically depicting a message flow of SCTP establishment and teardown procedure when the DRA platform is acting as client.
Figure 12:
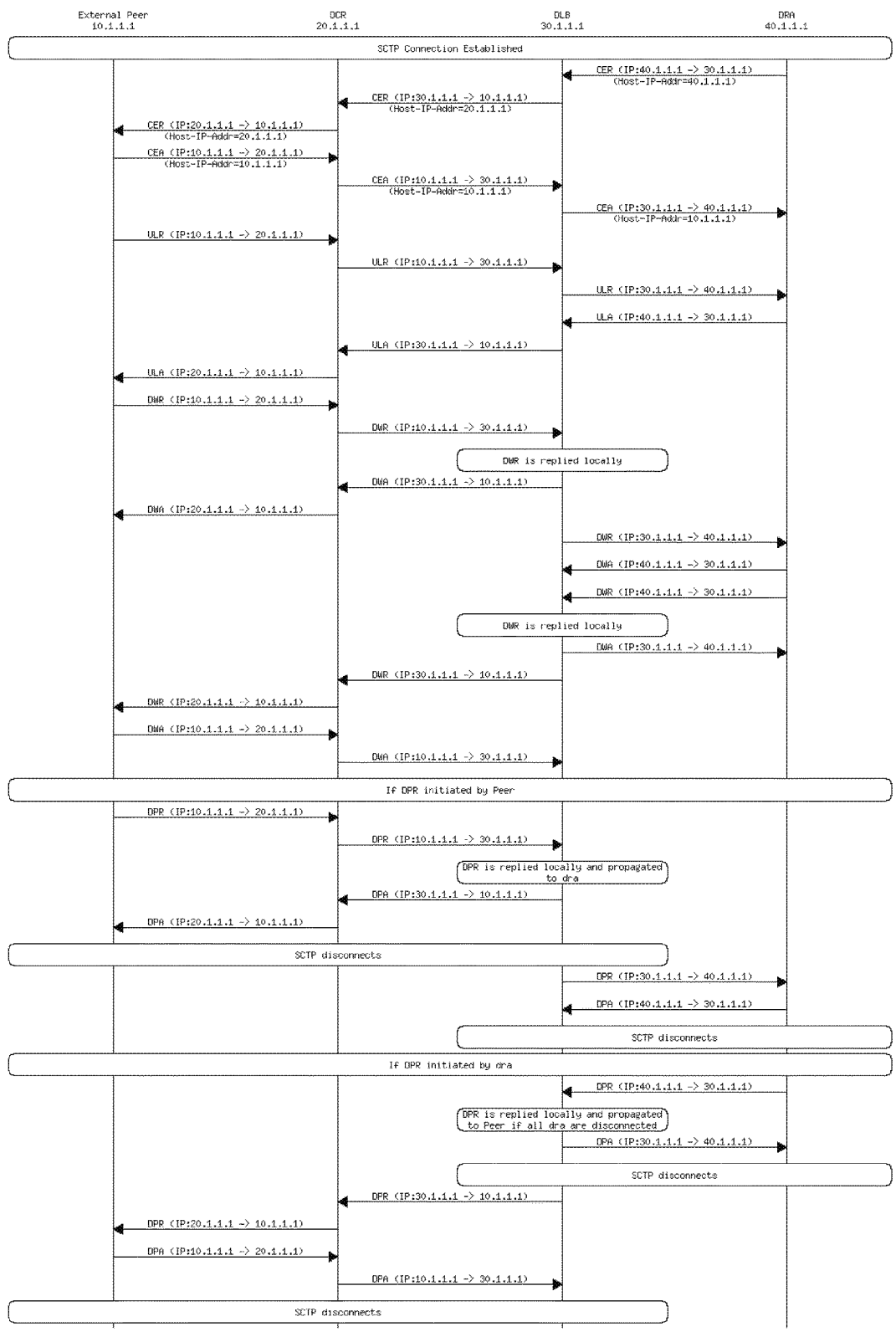
FIG. 12 is a sequential diagram schematically depicting a message flow of Diameter transaction when the DRA platform is acting as client.
Figure 13:
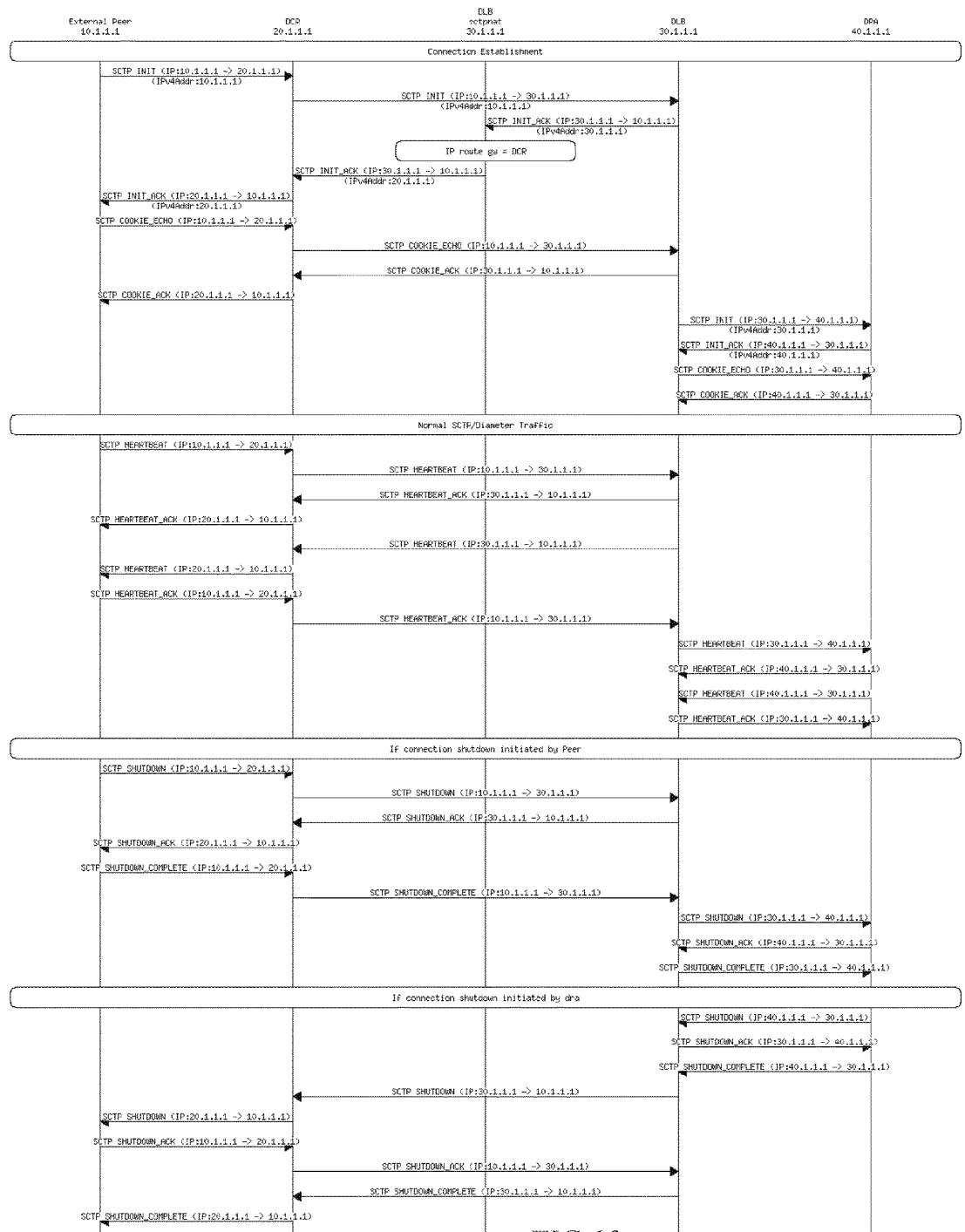
FIG. 13 is a sequential diagram schematically depicting a message flow of SCTP establishment and teardown procedure when the DRA platform is acting as server.
Figure 14:
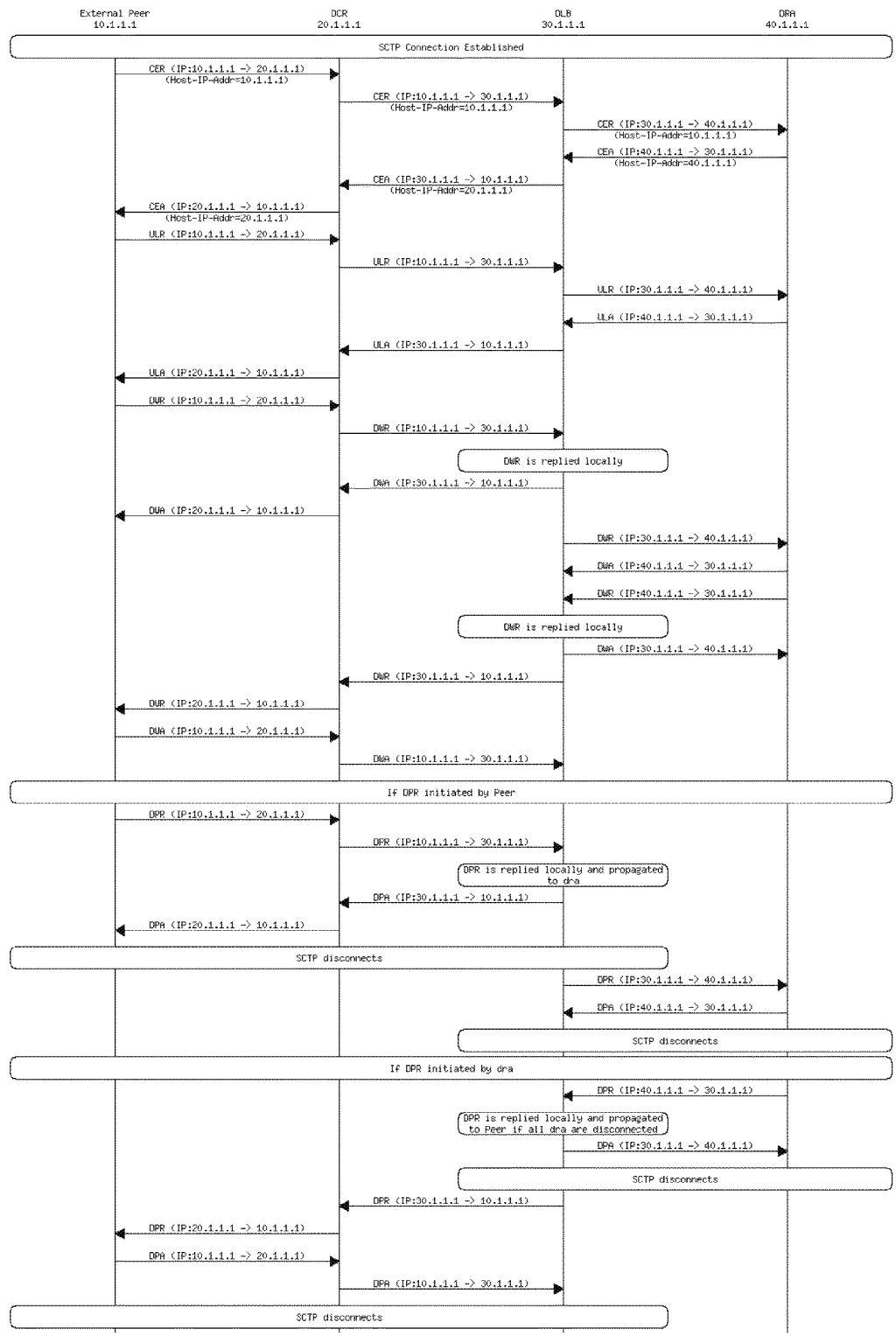
FIG. 14 is a sequential diagram schematically depicting a message flow of Diameter transaction when the DRA platform is acting as server.

FIGS. 11-14 are sequential diagrams schematically depicting exemplary message flow in various scenarios. FIGS. 11 and 12 depict scenarios in which DRA Platform 10 acts as a client. Specifically, FIG. 11 depicts a message flow of SCTP establishment and teardown procedure, and FIG. 12 depicts a message flow of Diameter transaction—in both scenarios DRA Platform 10 acts as client. FIGS. 13 and 14 depict scenarios in which DRA Platform 10 acts a server. Specifically, FIG. 13 is a sequential diagram schematically depicting a message flow of SCTP establishment and teardown procedure, and FIG. 14 depicts a message flow of Diameter transaction—in both scenarios DRA Platform 10 acts as server.

HARDWARE AND SOFTWARE INFRASTRUCTURE EXAMPLES

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of routing messages using a Diameter Protocol in a computer network, the method comprising:
   deploying a Diameter Connection Router (DCR) between a plurality of peers and a plurality of Diameter Load Balancers (DLBs), the DCR interfacing with the plurality of peers and configured to communicate with each DLB within the plurality of DLBs;
   providing a plurality of Diameter Routing Agents in communication with each DLB of the plurality of DLBs;
   exposing a public Internet Protocol (IP) address of the DCR to the plurality of peers as a single point of contact between the plurality of peers and the computer network, wherein an internal topology of the computer network is hidden from the plurality peers;
   receiving, by the DCR, a message from a first peer of the plurality of peers;
   selecting, by the DCR, a first DLB from the plurality of DLBs and routing the message to the first DLB, wherein a rule is created for subsequent messages from the first peer to bypass the DCR and to be routed to the first DLB;
   establishing a connection between the first DLB and each of the plurality of DRAs, thereby enabling the message from the first peer to reach any of the plurality of the DRAs;
   routing the message from the first DLB to a first DRA of the plurality of DRAs, wherein the first DRA performs message mediation based on an attribute selected from the group consisting of Diameter headers, Attribute-Value-Pair (AVP) of the message, and an identity of the first peer;
   routing the massage from the first DRA to a second DLB of the plurality of DLBs, the second DLB having a routing path to a second peer of the plurality of peers, the second DLB being selected by the first DRA;
   routing the message from the second DLB to the DCR;
   routing the massage from the DCR to the second peer; and
   responsive to a request to teardown a connection between the first peer and the second peer, deleting the rule for routing the subsequent messages from the first peer to bypass the DCR and to be routed from the first peer to the first DLB.

2. The method of claim 1, wherein the DCR performs destination-Network Address Translation (NAT) to translate a destination IP address of the message from the public IP address of the DCR to an IP address of the first DLB.

3. The method of claim 1, wherein, prior to routing the message to the second peer, the DCR performs source-NAT to translate a source IP address of the message from the IP address of the second DLB to the public IP address of the DCR.

4. The method of claim 1, wherein the second DLB performs a Stream Control Transmission Protocol (SCTP)-layer NAT to translate the IPv4Address parameter of the message from an IP address of the second DLB to the public IP address of the DCR.

5. The method of claim 1, further comprising the step of monitoring, by the first DLB, availability of each of the plurality of DRAs, and removing an unavailable DRA from a pool of DRAs available for traffic distribution.

6. The method of claim 1, wherein the DCR implements initial packet handling of the message using 'Netfilter' in LINUX operating system.

7. The method of claim 1, wherein the DCR implements Network Address Translation using 'iptable' in LINUX operating system.

8. The method of claim 1, wherein responsive to detecting that all connections between the first DLB and the plurality of the DRAs are broken, terminating connection between the first peer and the first DLB.

9. A system for routing messages a Diameter Protocol in a computer network, the system comprising:

a Diameter Connection Router (DCR), the DCR being deployed between a plurality peers and a plurality of Diameter Load Balancers (DLBs), wherein a public Internet Protocol (IP) address of the DCR is exposed to the plurality of peers without exposing an internal topology of the computer network;

wherein the DCR is configured to route a message from a first peer of the plurality of peers to a first DLB of the plurality of DLBs and is configured to create a rule for routing subsequent messages from the first peer to bypass the DCR and to be routed from the first peer to the first DLB; and a plurality of Diameter Routing Agents (DRAs) in communication with each of the plurality of DLBs, such that there is a communication path from the first peer to each of the plurality of the DRAs, wherein the message from the first user is routed to a first DRA of the plurality of DRAs, and the first DRA selects a second DLB from the plurality of DLBs for routing the message thereto, the DRA configured to perform message mediation based on an attribute selected from the group consisting of Diameter headers, Attribute-Value-Pair (AVP) of the message, and an identity of the first peer, and to route the message to the second DLB, the second DLB having a routing path to a second peer, thereby enabling routing of the messages from the first peer to the second peer; and wherein, responsive to a request to teardown a connection between the first peer and the second peer, the rule for the subsequent messages from the first peer to bypass the DCR and to be routed from the first peer to the first DLB is deleted.

10. The system of claim 9, wherein the exposed public IP address of the DCR is a single point of contact between the plurality of peers and the computer network.

11. The system of claim 9, wherein the second DLB performs a Stream Control Transmission Protocol (SCTP)-layer NAT to translate the IPv4Address parameter of the outgoing message from an IP address of the second DLB to the public IP address of the DCR.

12. The system of claim 9, further comprising the step of monitoring, by the first DLB, availability of each of the plurality of DRAs, and removing an unavailable DRA from the plurality of DRAs available for traffic distribution.

13. The system of claim 9, wherein responsive to detecting that all connections between the first DLB and the plurality of the DRAs are broken, terminating connection between the first peer and the first DLB.

14. The system of claim 9, wherein the DCR performs destination-Network Address Translation (NAT) to translate a destination IP address of the message from the public IP address of the DCR to an IP address of the first DLB.

15. The system of claim 9, wherein, prior to routing the message to the second peer, the DCR performs source-NAT to translate a source IP address of the message from the IP address of the second DLB to the public IP address of the DCR.

* * * * *